(12) United States Patent
Galinski, III

(10) Patent No.: US 8,957,655 B2
(45) Date of Patent: Feb. 17, 2015

(54) LAST GASP HOLD-UP CIRCUIT USING ADAPTIVE CONSTANT ON TIME CONTROL

(75) Inventor: Martin F. Galinski, III, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 387 days.

(21) Appl. No.: 13/422,917

(22) Filed: Mar. 16, 2012

(65) Prior Publication Data

US 2013/0241503 A1 Sep. 19, 2013

(51) Int. Cl.
*G05F 1/40* (2006.01)

(52) U.S. Cl.
USPC ............................................ 323/284; 323/282

(58) Field of Classification Search
USPC ................. 323/222, 224, 225, 282–290, 299; 365/185.18, 226
See application file for complete search history.

(56) References Cited

U.S. PATENT DOCUMENTS

| | | | |
|---|---|---|---|
| 4,743,835 A | 5/1988 | Bossé et al. | |
| 6,735,117 B2* | 5/2004 | Ott ........................... | 365/185.18 |
| 7,019,497 B2* | 3/2006 | Umminger et al. ............ | 323/220 |
| 7,145,316 B1* | 12/2006 | Galinski, III .................. | 323/288 |
| 7,221,107 B2* | 5/2007 | Melis ............................. | 315/291 |
| 8,350,539 B2* | 1/2013 | Chen et al. .................... | 323/224 |
| 8,643,351 B2 | 2/2014 | Lai et al. | |
| 8,693,276 B2 | 4/2014 | Lai et al. | |
| 2005/0254272 A1 | 11/2005 | Vinciarelli | |
| 2011/0156685 A1* | 6/2011 | Chen et al. .................... | 323/284 |

OTHER PUBLICATIONS

Jean Picard, "High-Voltage Energy Storage: The Key to Efficient Holdup," Texas Instruments Power Supply Design Seminar, SEM1800, 2008-2009, 38 pages.

* cited by examiner

*Primary Examiner* — Rajnikant Patel
(74) *Attorney, Agent, or Firm* — Van Pelt, Yi & James LLP

(57) ABSTRACT

A hold-up circuit coupled to a first node to receive an input voltage and to provide a hold-up voltage includes an inductor, a constant on-time buck-boost control circuit configured to drive a high-side power switch and a low-side power switch to operate in a buck mode and a boost mode of operation, and an energy storage capacitor. When the input voltage is greater than a predetermined threshold, the buck-boost control circuit is configured in the boost mode to drive the low-side power switch with constant on-time pulses and to charge the energy storage capacitor under non-synchronous operation. When the input voltage is less than a predetermined threshold, the buck-boost control circuit is configured in the buck mode to drive the high-side power switch with constant on-time pulses and to drive the low-side power switch under synchronous operation to provide the hold-up voltage to the first node.

6 Claims, 2 Drawing Sheets

LAST GASP HOLD-UP CIRCUIT USING ADAPTIVE CONSTANT ON TIME CONTROL

FIELD OF THE INVENTION

The invention relates to power supplies for electronic systems and, in particular, to a last gasp hold-up circuit for electronic systems using adaptive constant on-time control.

DESCRIPTION OF THE RELATED ART

Computer systems with volatile and non-volatile memories are used in many applications, including critical systems such as navigation control or medical devices. It is often desirable to allow a computer system to shut down gracefully in the event of a sudden power loss. While data in a volatile memory is lost when power is turned off, data in a non-volatile memory is retained when the power is turned off. However, in the event of a sudden power loss, data in non-volatile memories may become uncertain. This is because non-volatile memories, such as a flash memory, require certain amount of time period to complete erasures and write operations. When a power loss occurs during the writing or erasing of a non-volatile memory, the status of the data stored in the memory becomes unknown. Many high-reliability electronic systems therefore require such a hold-up circuit for supplying power to the system to ensure a graceful shutdown.

Hold-up circuits for supplying power to a periphery electronic device are known. Conventional hold-up circuits may involve storing energy using a large capacitor bank. Such solutions are sometimes undesirable because of the large capacitance value required, thus increasing cost and size of the hold-up circuit. Alternative hold-up circuits utilize high-voltage-energy storage which stores the energy on a capacitor at a higher voltage than the system power supply and then transfers the stored energy to the power bus during power loss. U.S. Pat. No. 6,735,117 to Ott describes a hold-up power supply for flash memory systems which operates to supply power needed to temporarily operate the flash memory in the event of a power loss. Energy is stored in a capacitor from a high voltage supply bus and the stored energy is used to allow the flash memory system to complete any erasures and writes when a power loss occurs, thus allowing the flash memory to shut down gracefully.

SUMMARY OF THE INVENTION

According to one embodiment of the present invention, a hold-up circuit coupled to a first node to receive an input voltage and to provide a hold-up voltage includes an inductor coupled between the first node and a second node; a constant on-time buck-boost control circuit configured to drive a high-side power switch and a low-side power switch to operate in a buck mode and a boost mode of operation where the low-side switch has a first current handling terminal coupled to the second node and a second current handling terminal coupled to a ground potential and the high-side switch has a first current handling terminal coupled to the second node and a second current handling terminal; and an energy storage capacitor coupled between the second current handling terminal of the high-side switch and the ground potential.

In operation, when the input voltage is greater than a predetermined threshold, the buck-boost control circuit is configured in the boost mode to drive the low-side power switch with constant on-time pulses and to charge the energy storage capacitor through a body diode of the high-side power switch under non-synchronous operation. When the input voltage is less than a predetermined threshold, the buck-boost control circuit is configured in the buck mode to drive the high-side power switch with constant on-time pulses and to drive the low-side power switch under synchronous operation to provide the hold-up voltage to the first node.

The present invention is better understood upon consideration of the detailed description below and the accompanying drawings.

DETAILED DESCRIPTION OF THE PREFERRED EMBODIMENTS

Figure 1:
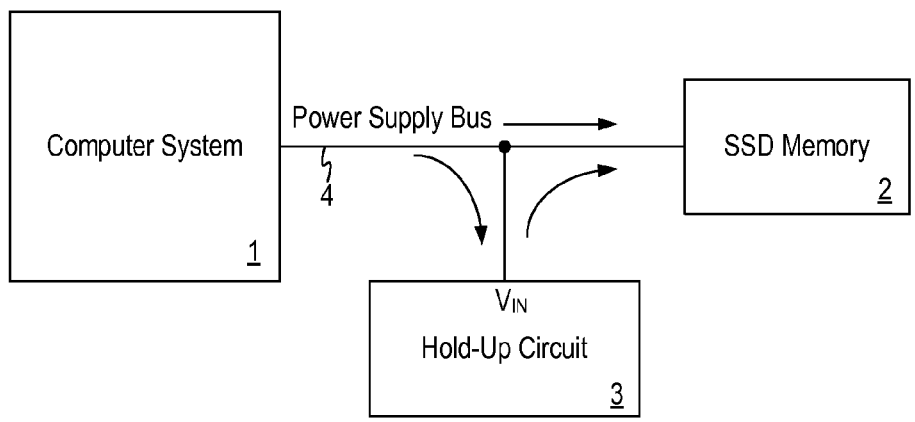
FIG. 1 illustrates a system in which the hold-up circuit of the present invention can be incorporated according to one embodiment of the present invention.

In accordance with the principles of the present invention, a last gasp hold-up circuit for providing power to an electronic system in the event of a loss of the primary power supply includes a buck-boost control circuit configured to drive a buck-boost converter implemented using only two power switches. Furthermore, the buck-boost control circuit employs constant on-time control to regulate the buck and boost modes of operation to simplify the compensation of the buck-boost converter, thereby ensuring stability. In this manner, the hold-up circuit realizes silicon area efficiency where the buck-boost control circuit drives the same two power switches to operate in either the buck mode (hold-up) and the boost mode (charge) and the same compensation circuitry is applied to both the buck mode or the boost mode.

Conventional buck-boost converters typically use four power switches to implement the buck mode and boost mode functions, two power switches for the buck mode and two power switches for the boost mode. However, in the hold-up circuit of the present invention, two power switches are controlled by a control circuit to operate in both the buck mode and the boost mode, reducing the silicon area for implementing the hold-up circuit and also reducing the complexity of the circuit.

More specifically, the constant on-time pulse generated by the buck-boost control circuit is moved from controlling the high-side power switch in the buck mode to controlling the low-side switch in the boost mode. Thus, the same on-time calculator and drive control circuitry can be used for both buck mode control and boost mode control, simplifying the buck-boost converter implementation. Furthermore, using a constant on-time control for the boost mode obviate the need for providing compensation for more complex boost mode control schemes.

The hold-up circuit of the present invention operates to ensure that when primary power supply of an electronic system suffers a power loss event, a "last gasp" supply of power is provided by taking the stored energy of a pre-charged capacitor and redirecting the stored energy back into the main power supply, thereby holding up the main power supply voltage for a given time period. The duration of the hold-up time is determined by the capacitance value of the energy storage capacitor and the voltage the capacitor is charged to. That is, the energy stored on the capacitor is given as $$E = \frac{1}{2}CV^2.$$

In the present description, a buck-boost converter refers to a switch mode power supply or a DC-to-DC converter operative to step down an input voltage (buck mode) and to step up the input voltage (boost mode). In operation, a buck-boost voltage converter receives an unregulated input voltage and generates an increased or decreased regulated output voltage, where the target output voltage is set by component values in a feedback circuit. In embodiments of the present invention, the buck-boost converter is regulated using a constant on-time regulation scheme where the switching duty cycle of the power switches control the output voltage. The switching of the power switches causes current to build up at an output inductor or causes current to be discharged from the output inductor to an output capacitor.

FIG. 1 illustrates a system in which the hold-up circuit of the present invention can be incorporated according to one embodiment of the present invention. Referring to FIG. 1, a computer system 1 is configured to communicate with and supply power to a solid-state drive (SSD) memory 2. The computer system 1 may supply the power to the SDD memory 2 on a power supply bus 4. A hold-up circuit 3 is coupled to the power supply bus to supply power to the SSD memory 2 in the event of a power loss on the power supply bus 4.

More specifically, the hold-up circuit 3 monitors the voltage on the power supply bus 4, such as through the input voltage $V_{IN}$ node. When the hold-up circuit 3 detects that the voltage on the power supply bus 4 has dropped below a given threshold, the hold-up circuit 3 activates to supply power to the SSD memory 2. Meanwhile, the hold-up circuit 3 is being recharged by the power supply bus when the power supply bus is operational.

Figure 2:
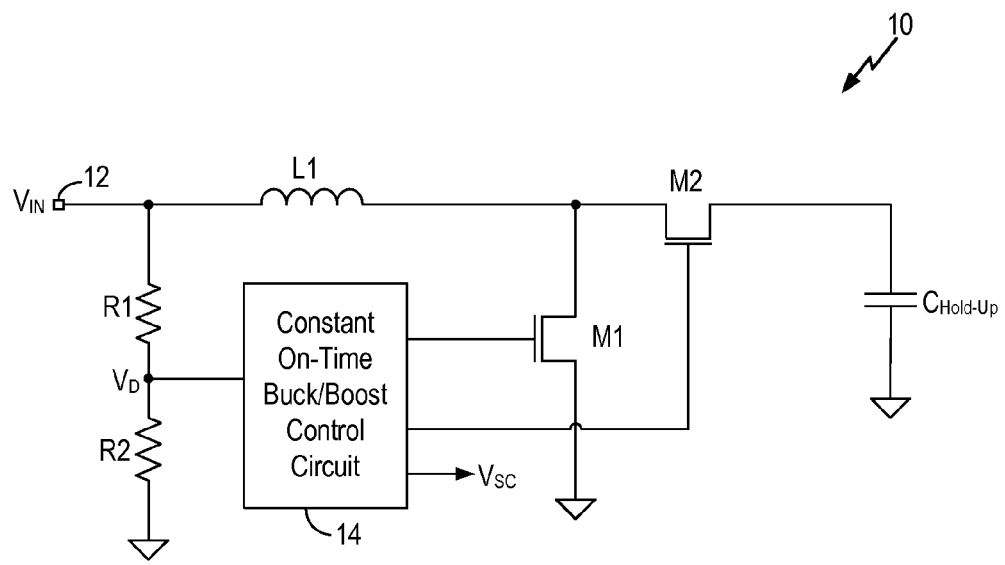
FIG. 2 is a simplified schematic diagram of a hold-up circuit according to one embodiment of the present invention.

FIG. 2 is a simplified schematic diagram of a hold-up circuit according to one embodiment of the present invention. Referring to FIG. 2, a hold-up circuit 10 includes a voltage input node 12 connected to the primary power supply of an electronic device, such as the SSD memory 2 in FIG. 1. Although the voltage input node 12 is denoted with a voltage $V_{IN}$, the voltage input node 12 is configured to receive an input voltage during a charge mode of the hold-up circuit and also configured to provide an output voltage during a hold-up mode of the hold-up circuit, as will be explained in more detail below. The hold-up circuit 10 includes a constant on-time buck/boost control circuit 14 configured to drive a pair of power switches M1 and M2. The hold-up circuit 10 also includes an inductor L1, a voltage divider formed by resistors R1 and R2, and an energy storage capacitor $C_{Hold-Up}$.

In hold-up circuit 10, power switches M1 and M2 are driven by the control circuit 14 to either operate in the boost mode to charge up capacitor $C_{Hold-Up}$ or in the buck mode to provide an output voltage to hold-up the voltage input node 12 using the stored energy on capacitor $C_{Hold-Up}$. Furthermore, the buck and boost operations are regulated under a constant on-time control scheme. Power switches M1 and M2 are driven by the control circuit to turn on and off synchronously and are mutually exclusive of each other in operation. That is, power switch M1 is turned on when power switch M2 is turned off and vice versa.

In operation, the control circuit 14 monitors the voltage level at the voltage input node 12 through the voltage divider of resistors R1 and R2. The control circuit 14 determines if the voltage level at the voltage input node 12 indicates an operational primary supply or a power loss event.

When the primary power supply to which the hold-up circuit is coupled is operational, the hold-up circuit 10 operates in the boost mode to charge up or recharge the energy storage capacitor $C_{Hold-Up}$. The voltage input node 12 receives the primary power supply voltage as the input voltage V. In the boost mode, the control circuit 14 drives the low-side power switch M1 with constant on-time pulses so that power switch M1 is driven with a constant on-time duty cycle. When power switch M1 is "on" or closed and power switch M2 is open, current builds up at inductor L1. Then, power switch M2 is closed and power switch M1 is open to discharge the current accumulated on inductor L1 onto capacitor $C_{Hold-Up}$. In this manner, capacitor $C_{Hold-Up}$ is charged to a voltage higher than the voltage level of the primary power supply. In some embodiments, the high side power switch M2 is disabled through a body-diode to realize a non-synchronous boost operation.

When the primary power supply to which the hold-up circuit is coupled suffers a power loss, the hold-up circuit 10 operates in the buck mode to sustain or hold-up the primary supply voltage using the charge stored on the energy storage capacitor $C_{Hold-Up}$. In the buck mode, the control circuit 14 drives the high-side power switch M2 with constant on-time pulses so that power switch M2 is driven with a constant on-time duty cycle. When power switch M2 is turned on and power switch M1 is turned off, the energy stored on capacitor $C_{Hold-Up}$ is supplied to inductor L1 to cause the inductor current to build up. Then, power switch M1 is turned on and power switch M2 is turned off to discharge the current in the inductor L1 to the voltage input node 12, thereby supplying a hold-up voltage to the power supply bus to which the hold-up circuit is coupled. In the buck mode of operation, the voltage $V_{IN}$ maintained at node 12, being the primary power supply voltage, has a voltage value less than the voltage of the pre-charged capacitor $C_{Hold-Up}$.

In this manner, the hold-up circuit 10 applies a buck-boost control circuit and a constant on-time control scheme to realize efficiency and effective hold-up power operation.

In embodiments of the present invention, the control circuit 14 is further configured to monitor the voltage of the energy storage capacitor $C_{Hold-Up}$ to avoid overcharging the storage capacitor. Furthermore, in embodiments of the present invention, the control circuit is further configured to generate a control signal which can be used to disconnect the primary power supply to the electronic device, such as the control signal $V_{SC}$ driving switch S1 in FIG. 1.

Figure 3:
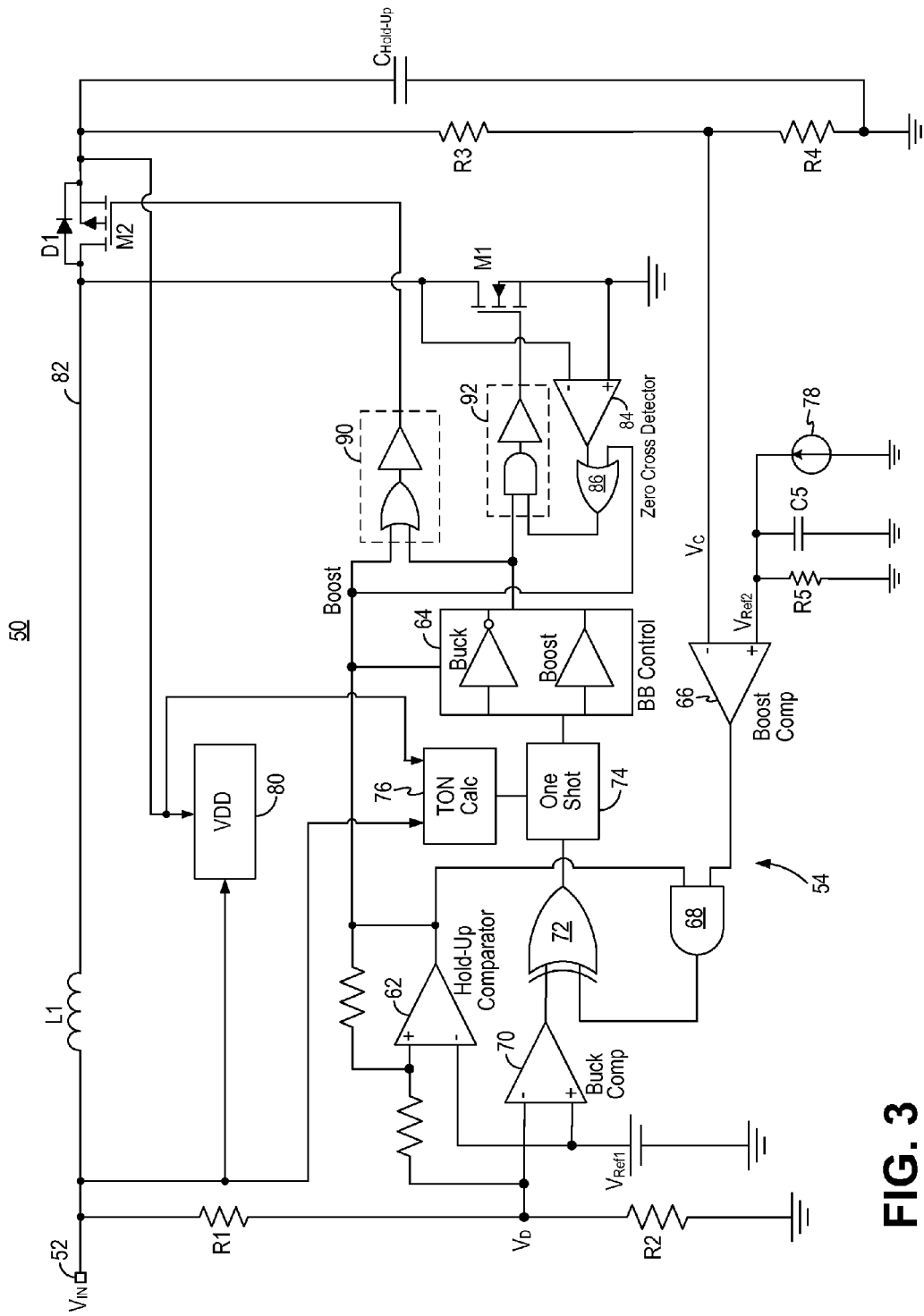
FIG. 3 is a detailed circuit diagram of a hold-up circuit according to one embodiment of the present invention.

FIG. 3 is a detailed circuit diagram of a hold-up circuit according to one embodiment of the present invention. Referring to FIG. 3, a hold-up circuit 50 includes a voltage input node 52 connected to the primary power supply of an electronic device, such as the SSD memory 2 in FIG. 1. The voltage input node 52 may receive an input voltage $V_{IN}$ from the primary power supply in a charge mode and may supply a hold-up voltage to the electronic device in a hold-up mode. The hold-up circuit 50 includes a constant on-time buck-boost control circuit 54 configured to drive a low-side power switch M1 and a high-side power switch M2. The hold-up circuit 50 includes an inductor L1, a voltage divider formed by resistors R1 and R2 configured to divide down the input voltage $V_{IN}$, and an energy storage capacitor $C_{Hold-Up}$. The buck-boost control circuit 54 monitors the primary power supply voltage to determine the operation mode. In the present embodiment, the input voltage $V_{IN}$ is divided down by the voltage divider of resistors R1 and R2 to a voltage $V_D$ which is then provided to the buck-boost control circuit. In other embodiments, the input voltage $V_{IN}$ may be used directly without being divided down.

The divided down input voltage $V_D$ is coupled to a hold-up comparator 62 configured to compare the voltage $V_D$ to a reference voltage $V_{Ref1}$. The hold-up comparator 62 control the voltage threshold at which the hold-up circuit 50 enters the boost mode (charge) of operation or the buck mode (hold-up) of operation. The boost and buck modes of operation will be explained in more detail below.

Boost Operation (Charge)

When voltage $V_D$ is greater than the reference voltage $V_{Ref1}$, the input voltage $V_{IN}$ is operational and the hold-up circuit 50 is operated in the boost mode to charge the energy storage capacitor $C_{HOLD-UP}$. The hold-up comparator 62 generates a control signal for a BB control circuit 64 and also for a logical AND gate 68. The control signal enables the AND gate 68 to allow a boost comparator 66 to drive a one-shot circuit 74 through a logical XOR gate 72 in the boost mode. The one-shot circuit 74 generates a constant on-time pulse which is provided to the BB control circuit 64. The control signal coupled to the BB control circuit 64 instructs the BB control circuit to direct the constant on-time pulse to the low-side power switch M1. In the boost mode, the high-side power switch M2 can be disabled through the body-diode to realize a non-synchronous boost operation. In other embodiments, power switches M1 and M2 can be driven synchronously.

At the XOR gate 72, the input signal received from the output of a buck comparator 70 is low because the voltage $V_D$ is greater than the reference voltage $V_{Ref1}$. Thus, only the boost comparator 66 drives the one-shot circuit 74 through the XOR gate. Meanwhile, the boost comparator 66 monitors the voltage across the energy storage capacitor $C_{HOLD-UP}$. More specifically, the voltage across the energy storage capacitor $C_{HOLD-UP}$ is divided down by a voltage divider of resistors R1 and R4 into a voltage $V_C$. The boost comparator 66 compares voltage $V_C$ to a reference voltage $V_{Ref2}$. When voltage $V_C$ is less than the reference voltage $V_{Ref2}$, the boost comparator 66 generates a logical high output which drives the AND gate 68, through the XOR gate 72, to the one-shot circuit 74 to generate a constant on-time $T_{ON}$ pulse. The BB control circuit 64 directs the constant on-time $T_{ON}$ pulse to the low-side power switch M1 to turn on the low-side power switch. In this manner, the inductor current at inductor L1 builds up.

After the on-time provided by the $T_{ON}$ pulse terminates, low-side power switch M1 is turned off and the high-side power switch M2 is either turned on or is disabled but conducting through the body diode D1. The inductor current is discharged to the storage capacitor $C_{HOLD-UP}$, charging the capacitor to a voltage potential greater than the input voltage. The boost comparator 66 controls the charge voltage of the storage capacitor $C_{HOLD-UP}$ by signaling the constant on-time pulse whenever the voltage $V_C$ is less than the reference voltage $V_{Ref2}$. The boost mode operation continues until capacitor $C_{Hold-up}$ is charged to a predetermined potential set by the reference voltage $V_{Ref2}$.

In one embodiment, the reference voltage $V_{Ref2}$ is selected to control how much time it takes to charge up the storage capacitor $C_{Hold-up}$. Voltage $V_{Ref2}$ is set by a capacitor C5 and a resistor R5 coupled to a current source 78. The capacitance value and resistance value and the current source value are selected to set the reference voltage $V_{Ref2}$ to determine how long it should take to fully charge storage capacitor $C_{Hold-Up}$.

In the present embodiment, an on-time calculator 76, receiving the input voltage $V_{IN}$ and also the voltage across capacitor $C_{Hold-Up}$, calculates the desired constant on-time for the one-shot circuit 74. Also, a VDD circuit 80 generates the power supply voltage necessary for the circuitries of the hold-up circuit 50.

Buck Operation

When there is a disruption of the primary power supply voltage, the hold-up comparator 62 detects that the divided down voltage $V_D$, indicative of the input voltage $V_{IN}$, has dropped below the reference voltage $V_{Ref1}$. The hold-up comparator 62 generates the control signal for the BB control circuit 64 to instruct the BB control circuit 64 to enter the buck mode to hold-up the voltage at the input node. The control signal from the hold-up comparator 62 disables the AND gate 68 so that the boost comparator 66 no longer controls the one-shot circuit 74. Instead, the buck comparator 70 controls the voltage regulation by comparing the voltage $V_D$ with reference voltage $V_{Ref1}$. Buck comparator 70 controls the one-shot circuit 74 through XOR gate 72 to generate the constant one-time pulse. The control signal coupled to the BB control circuit 64 instructs the BB control circuit to direct the constant on-time pulse to the high-side power switch M2. The inverse of the constant on-time pulse is coupled to drive the low-side switch M1 for synchronous operation. In this manner, energy stored on capacitor $C_{Hold-Up}$ is transferred to charge up inductor L1 and then provided to drive the voltage input node 52.

The hold-up circuit 50 regulates the voltage at the voltage input node 52 until capacitor $C_{Hold-Up}$ is discharged to the same potential at the voltage input node 52. In this manner, a hold-up voltage is provided at the voltage input node 52 for duration determined by the hold-up voltage, the capacitance of $C_{Hold-Up}$ and the voltage the capacitor is charged to.

A Zero Cross Detector for buck mode monitors node 82 to determine if it drops below ground. If the hold-up circuit is in boost mode, the zero cross detect does not matter. If the hold-up circuit is in buck mode, when node 82 is higher than ground, detector 84 output is low and low-side switch is turned off. When node 82 is lower than ground, then detector 84 output is high, OR gate 86 goes high and allows driver 92 to drive low-side switch M1.

The above detailed descriptions are provided to illustrate specific embodiments of the present invention and are not intended to be limiting. Numerous modifications and variations within the scope of the present invention are possible. The present invention is defined by the appended claims.

I claim:

1. A hold-up circuit coupled to a first node to receive an input voltage and to provide a hold-up voltage, the hold-up circuit comprising:
    an inductor coupled between the first node and a second node, the input voltage being provided to the first node;
    a constant on-time buck-boost control circuit configured to drive a high-side power switch and a low-side power switch to operate in a buck mode and a boost mode of operation, the low-side switch having a first current handling terminal coupled to the second node and a second current handling terminal coupled to a ground potential, the high-side switch having a first current handling terminal coupled to the second node and a second current handling terminal; and
    an energy storage capacitor coupled between the second current handling terminal of the high-side switch and the ground potential,
    wherein in response to the input voltage being greater than a predetermined threshold, the buck-boost control circuit is configured in the boost mode to drive the low-side power switch with constant on-time pulses and to charge the energy storage capacitor through the high-side power switch; and in response to the input voltage being less than the predetermined threshold, the buck-boost control circuit is configured in the buck mode to drive the high-side power switch with constant on-time pulses and to drive the low-side power switch under synchronous operation to supply the energy stored on the energy storage capacitor to the inductor to provide the hold-up voltage to the first node.

2. The hold-up circuit of claim 1, further comprising:
a voltage divider coupled to the first node to divide down the input voltage, the divided voltage being provided to the buck-boost control circuit to configure the buck-boost control circuit to operate in the boost mode or the buck mode.

3. The hold-up circuit of claim 1, wherein the buck-boost control circuit comprises:
a hold-up comparator configured to compare a voltage indicative of the input voltage to a first reference voltage, the hold-up comparator generating a control signal having a first state indicating a boost mode of operation and a second state indicating a buck mode of operation;
a one-shot circuit configured to generate a constant on-time pulse;
a buck-boost circuit configured to receive the control signal and to drive the high-side power switch with the constant on-time pulse in the buck mode or to drive the low-side power switch with the constant on-time pulse in the boost mode in response to the control signal;
a boost comparator configured to compare a voltage indicative of a voltage across the energy storage capacitor and a second reference voltage, the boost comparator generating an output signal driving the one-shot circuit when the hold-up comparator generates a control signal in the first state; and
a buck comparator configured to compare a voltage indicative of the input voltage and the first reference voltage, the buck comparator generating an output signal driving the one-shot circuit when the boost comparator is not driving the one-shot circuit.

4. The hold-up circuit of claim 3, wherein the second reference voltage is generated by charging a second capacitor using a current source, the capacitance value of the second capacitor and the current value of the current source determining the second reference voltage.

5. The hold-up circuit of claim 1, wherein in response to the input voltage being greater than the predetermined threshold, the buck-boost control circuit is configured in the boost mode to drive the low-side power switch with constant on-time pulses and to charge the energy storage capacitor through a body diode of the high-side power switch under non-synchronous operation.

6. The hold-up circuit of claim 1, wherein in response to the input voltage being greater than the predetermined threshold, the buck-boost control circuit is configured in the boost mode to drive the low-side power switch with constant on-time pulses and to drive the high-side power switch under synchronous operation.

* * * * *